Patented Apr. 23, 1946

2,398,867

UNITED STATES PATENT OFFICE 2,398,867

MANUFACTURE OF HALOGENATED ORGANIC ACIDS

Hanns Peter Staudinger, Ewell, and Karl Heinrich Walter Tuerck, Banstead, England, assignors to The Distillers Company Limited, Edinburgh, Scotland, a British company No Drawing. Application September 10, 1942, Serial No. 457,874
In Great Britain April 10, 1941

6 Claims. (Cl. 260—530)

This invention relates to the manufacture of halogenated organic acids containing a chlorine atom in the alpha-position to the carboxyl group.

Aliphatic aldehydes such as monochloroacetaldehyde, which contain one chlorine atom in the alpha-position, are known not to be auto-oxidizable in the liquid form (see Beilstein, vol. 1, page 610). The usual method of preparing these alpha-chloro acids is therefore to chlorinate the corresponding aliphatic acid.

We have found that aliphatic aldehydes which contain an olefinic double bond in the alpha-beta position to the aldehyde group and a chlorine atom in the alpha-position to the same aldehyde group, react very readily with molecular oxygen at normal or moderately increased temperature, forming the corresponding alpha-chlorinated acids in good yields.

According to our invention, these alpha-chloro-alpha-beta-unsaturated aldehydes, such as alpha-chloroacrolein or alpha-chlorocrotonaldehyde, are brought into intimate contact with oxygen or gases containing free molecular oxygen at temperatures below 100° C. Our invention provides a simple process for the manufacture of alpha-chlorinated aliphatic acids which hitherto had been prepared only in complicated ways, e. g. by the oxidation of the trichloro-aldehydes with nitric acids or similar oxidising agents and subsequent treatment of the tri-chloroacids with zinc (see Roberts, Journal of the Chemical Society, 1938, p. 779), or, in the case of chloroacrylic acid, by the condensation of trichlorethylene with formaldehyde and treatment of the condensation product with sulphuric acid at high temperatures (British Patent 514,619).

The alphachloroacrolein as well as the alpha-chlorocrotonaldehyde, which are colourless liquids when freshly prepared, show a marked tendency to form more or less coloured substances, which may be condensation, or polymerisation, products on standing. It is, therefore, surprising that they can be successfully oxidized in the process according to our invention.

Solvents may be advantageously used during the oxidation as by their presence the formation of by-products can be further restricted. Useful solvents are organic acids, such as acetic acid, ketones such as acetone, esters, alcohols, hydrocarbons and chlorinated hydrocarbons. Water may also be present if a water-miscible solvent is also used. The use of solvents furthermore enables the oxidation reaction to be carried out substantially to completion whereby no aldehyde is left in the reaction mixture, so that it is not necessary to recover the aldehyde, the handling of which requires special precautions.

We have now discovered that among the products of oxidation there is a more or less considerable amount of hydrogen chloride. Apart from the hydrogen chloride affecting the yield of the carboxylic acid it has the disadvantage that it adds on to the unsaturated aldehyde which is the starting material thus forming the dichloro-aldehyde which is no longer oxidisable under the conditions of the reaction and which, furthermore, decomposes and resinifies during the distillation of the reaction products and is very difficult to separate from the desired carboxylic acid.

According to a feature of the present invention therefore the oxidation of the alpha-beta-unsaturated alpha-chloro-aldehyde is effected under conditions such that the hydrogen chloride is substantially prevented from interfering in the reaction, e. g. by suppressing the production of HCl and/or by removal thereof from the sphere of reaction.

We have found that the amount of the hydrogen chloride formed during the oxidation is greater the lower is the temperature at which the oxidation is effected.

We prefer, therefore, to carry out the oxidation of the alpha-beta-unsaturated alpha-chloro-aldehyde at temperatures between 30° and 100° C. preferably from 30° to 60° C.

We have found that it is desirable to effect the oxidation of the aldehyde in solution, preferably solutions in which the concentration of the aldehyde is less than 60% by weight, preferably less than 30% by weight; by adding the aldehyde gradually to a body of solvent in the reaction vessel or by adopting a method of continuous operation so that only small amounts of aldehyde, that is to say of the order of 5 to 10% by weight, are present at any given time, the amount of undesirable by-products in the reaction product can be further reduced.

Though generally the present oxidation proceeds so readily that catalysts are not necessary, it is advantageous to use, as catalysts, compounds of metals such as copper, manganese, cobalt, nickel, vanadium, iron, chromium, uranium, tungsten or molybdenum as oxides, salts or acidic salts, or such catalysts as those mentioned in our copending U. S. application No. 411,758.

We prefer however, to use manganese compounds, as well as the other catalysts mentioned above, at temperatures of 30°–60° C., especially as the manganese compounds reduce the speed of oxidation considerably at the lower temperatures.

When using manganese, cobalt, copper, iron or nickel compounds as catalysts we have found that these catalysts are more efficient if they are used, at least partially, in the form of salts of organic acids, such as acetic acid or the alphachloro-unsaturated acids themselves. As the small amounts of free hydrogen chloride formed are able to convert the catalyst salts into the chlorides, we prefer to neutralize the free hydrogen chloride by adding metal salts of organic acids, such as sodium acetate; alternatively an excess of a catalyst salt, such as manganese acetate may be used.

Apart from this we have found it to be useful to provide means for preventing the action of any free hydrogen chloride on unchanged aldehyde. This is achieved by adding such neutralizing substances as are mentioned above or by adding a sufficient amount of water.

In view of the discovery of the presence of free hydrogen chloride among the reaction products it is of course desirable to carry out the oxidation in an apparatus constructed of a material which is unaffected by hydrogen chloride. Whereas the oxidation of other aldehydes is generally carried out in aluminum vessels, and the chloro-fatty acids are stored in copper or nickel plants, we prefer to use reaction vessels which are resistant to attack by hydrogen chloride, such as corrosion resistant steel alloys, ferrosilicon alloys, lead-lined, or stone-ware vessels, if the above-mentioned precautions completely to eliminate or neutralise hydrogen chloride are not adopted. We also prefer to use solvents such as tetrachlorethane, tetrachlorethylene, toluene or monochlorbenzene, which, to a large extent, suppress the corrosion of iron or steel surfaces by hydrogen chloride.

The action of the evolved hydrogen chloride on the material of which the reaction vessel is composed not only leads to contamination of the product with inorganic impurities, but also may lead to the production of explosive hydrogen-oxygen mixtures with possible reduction of the catalyst, and in addition the hydrogen tends to suppress the oxidation reaction itself, possibly by the reduction of an intermediate oxidation product such as a per-compound.

Instead of oxygen itself, gases containing free oxygen can be used. As the reaction proceeds rather vigorously it is even advantageous to use dilute oxygen, e. g. air. An excess of the oxygen-containing gas may be used so that the gas leaving the oxidation vessel carries away any hydrogen chloride formed. This effect may be enhanced by using a solvent in which hydrogen chloride in only sparingly soluble, such as a hydrocarbon or chlorinated hydrocarbon.

The process may be carried out batchwise or continuously, e. g. by leading the aldehyde dissolved in a solvent in countercurrent flow to the oxygen in a packed tower which is provided with cooling devices.

We have further found that, even when the oxidation is carried out at temperatures at which the formation of polymers or coloured by-products is noticeable, it is possible to obtain the acids in good yields by stopping the reaction after the main part of the aldehyde, preferably 60–70%, has been oxidised or by continuing the oxidation at lower temperatures, e. g. at or below room temperature. Normal or superatmospheric pressure may be used.

Besides the alphachloro-alpha-beta-unsaturated acids there are among the reaction products the corresponding anhydrides and per-compounds. When alcohols are used as solvents, esters may be found among the reaction products. The reaction mixture may be worked up e. g. by distillation with or without steam, preferably in vacuo, by crystallising out the acids, or by direct esterification of the acids. The solvent and unchanged aldehyde may be distilled off, preferably in vacuo. As the unchanged aldehydes distil over readily with steam, a separation can also be effected by a simple steam distillation from an aqueous solution.

As the chloro-unsaturated acids are rather volatile even below their boiling point, it is advantageous to esterify the reaction mixture directly especially with higher alcohols, such as butanol, amyl alcohol, and thus to isolate the acids in the form of their esters. This method has the further advantage that the esters are obtained as colourless liquids, whereas distillation of the reaction mixture containing the acid, even in vacuo, easily leads to products which, even after repeated fractional distillation, cannot be entirely purified. It may however be noted, that the distillation of the reaction products yields little or no coloured products if the oxidation is carried out at temperatures above 30° C.

It may be advisable to add stabilizers during the isolation of the chlorinated acids in order to prevent discoloration or polymerisation. A preferred method of isolating the chlorinated acids is that involving the use of a diluent as described in our copending U. S. application No. 433,631.

The following examples illustrate how the invention may be carried into effect:

*Example 1*

34 parts of alphachloroacrolein dissolved in 35 parts of acetone are vigorously agitated while oxygen is introduced. By constant cooling the temperature is kept at 30° for 1½ hours. In this time 60% of the aldehyde was oxidised. The oxidation was continued at 10° C. for another 10 hours. The reaction mixture contained alpha-chloro-acrylic acid.

*Example 2*

103 parts of alphachlorocrotonaldehyde are agitated with oxygen under a pressure of 1400 mm. Hg at a temperature of 10–20° C. After two hours the reaction slows down considerably, but is continued till all the aldehyde has been oxidised. The reaction mixture contained alphachlorocrotonic acid.

*Example 3*

A mixture of 50 parts of alpha-chlorocrotonaldehyde and 50 parts of acetic acid are vigorously agitated whilst oxygen is introduced. Absorption of oxygen takes place rapidly, the temperature being maintained at 12° C. After absorption of oxygen ceases, the reaction mixture contains 43 parts of alpha-chlorocrotonic acid, together with 5 parts of free hydrogen chloride. On standing, the mixture warms up noticeably and gives off oxygen, at the same time darkening in colour; the product darkens during distillation and a resinous black product remains in the still.

Example 4

If a mixture similar to that of Example 3 is treated with 50 parts of oxygen at 50° C. in the presence of 0.1 part of vanadic acid, the reaction mixture contains only 0.01 part of hydrogen chloride. The mixture is colourless and remains stable on standing. After distilling off the acetic acid under vacuum, a fraction boiling at 85 to 95° C. at 10 mm. pressure is obtained, which solidifies on cooling to a mass of crystals of needle-shape.

Example 5

A mixture of 30 parts of alpha-chloroacrolein with 74 parts of acetic acid is treated with oxygen at 36° C. with violent agitation. The absorption of oxygen which proceeds rapidly at the commencement, slows down after one hour, at which point 21 parts of alpha-chloroacrolein have been oxidised to alpha-chloro-acrylic acid, while two parts of free hydrogen chloride have been formed.

Example 6

A mixture of 30 parts of alpha-chloroacrolein with 74 parts of acetic acid is treated with oxygen in the presence of 5 parts of manganese acetate and 0.2 parts of vanadic acid at 40° C., 22.5 parts of alpha-chloroacrolein were found to be oxidised to alpha-chloroacrylic acid at the end of 1 hour, the amount of hydrogen chloride (which is converted to manganese chloride during the reaction) being reduced to 1.2 parts.

Example 7

100 parts of 30% solution of alpha-chloroacrolein were oxidised with oxygen in the presence of manganese vanadate and a small amount of hydroquinone as stabiliser for 2 hours at 45° C. To the solution 300 parts of ethyl alcohol were added and the whole allowed to stand at room temperature for 24 hours. The product was washed with water, dried and fractionated. Ethyl alpha-chloroacrylate was obtained as a colourless liquid boiling at 140° C. at atmospheric pressure.

What we claim is:

1. A process for the manufacture of alpha-chloro-acrylic acid which comprises oxidising alpha-chloro-acrolein dissolved in an inert solvent in a concentration of not more than 60% by weight by the action of molecular oxygen in intimate contact with said solution whilst maintaining a reaction temperature of from 30° to 60° C. to produce a substantially colourless stable reaction mixture containing alpha-chloro-acrylic acid as the main reaction product and, as a by-product, hydrogen chloride and removing said hydrogen chloride from the reaction mixture.

2. A process for the manufacture of alpha-chloro-acrylic acid which comprises oxidising alpha-chloro-acrolein dissolved in an inert solvent in a concentration of not more than 60% by weight by the action of molecular oxygen in intimate contact with said solution in the presence of vanadic acid and manganese acetate as oxidation catalysts, said manganese acetate also acting to neutralise the evolved by-product hydrogen chloride whilst maintaining a reaction temperature of from 30° to 60° C. to produce a substantially colourless stable reaction mixture containing alpha-chloro-acrylic acid as the main reaction product.

3. A process according to claim 1 wherein the oxidation is effected in a reaction vessel formed of a material resistant to corrosion by hydrogen chloride.

4. A process according to claim 1 wherein said by-product, hydrogen chloride, is removed from the reaction mixture by passing an excess of molecular oxygen through the reaction mixture.

5. A process according to claim 1 wherein said by-product, hydrogen chloride, is removed from the reaction mixture by the action of a salt of a weak acid adapted to neutralise said evolved by-product, hydrogen chloride.

6. A process according to claim 1 wherein the oxidation is effected in the presence of an oxygen-carrying catalyst of the class consisting of compounds of copper, manganese, cobalt, nickel, vanadium, iron, chromium, uranium, tungsten and molybdenum including the oxides and organic acid salts thereof.

HANNS PETER STAUDINGER.
KARL HEINRICH WALTER TUERCK.